United States Patent

Wu

Patent Number: 6,145,747
Date of Patent: Nov. 14, 2000

[54] MEMORY CARD AND CARD CONNECTOR AND ASSEMBLY THEREOF

[75] Inventor: Kun-Tsan Wu, Tu-Chen, Taiwan

[73] Assignee: Hon Hai Precision Ind. Co., Ltd., Taipei Hsien, Taiwan

[21] Appl. No.: 09/122,229

[22] Filed: Jul. 24, 1998

[30] Foreign Application Priority Data

Oct. 24, 1997 [TW] Taiwan .................................. 86218124

[51] Int. Cl.⁷ ....................................................... G06K 7/00
[52] U.S. Cl. ............................................. 235/486; 235/475
[58] Field of Search .................................... 235/441, 486, 235/492, 475, 476, 477, 478, 479

[56] References Cited

U.S. PATENT DOCUMENTS

| | | | |
|---|---|---|---|
| 5,500,517 | 3/1996 | Cagliostro ................................ | 235/486 |
| 5,563,397 | 10/1996 | Fujimoto et al. ........................ | 235/441 |
| 5,736,727 | 4/1998 | Nakata et al. ........................... | 235/486 |
| 5,739,515 | 4/1998 | Takemura ................................ | 235/441 |
| 5,929,416 | 7/1999 | Dos Santos Pato et al. ........... | 235/439 |
| 5,955,722 | 9/1999 | Kurz et al. .............................. | 235/479 |

FOREIGN PATENT DOCUMENTS

| | | | |
|---|---|---|---|
| 0028892 | 2/1987 | Japan ..................................... | 235/486 |
| 0035586 | 2/1990 | Japan ..................................... | 235/486 |
| 403141486 | 6/1991 | Japan ..................................... | 235/486 |
| 403194680 | 8/1991 | Japan ..................................... | 234/486 |
| 403282990 | 12/1991 | Japan ..................................... | 235/486 |
| 404018690 | 1/1992 | Japan ..................................... | 235/486 |
| 404205079 | 7/1992 | Japan ..................................... | 235/486 |
| 405233887 | 2/1993 | Japan ..................................... | 235/486 |

*Primary Examiner*—Thien M. Le

[57] ABSTRACT

A memory card includes a metal shielding enclosing an insulative housing in which contacts are received for suppressing noise. A card connector is adapted to receive the memory card therein and includes an ejector mechanism having a push bar and a lever plate for ejecting the memory card. The lever plate is operative to pivot about a protrusion formed on a metal frame which also shields noise into/from the card connector.

19 Claims, 9 Drawing Sheets

MEMORY CARD AND CARD CONNECTOR AND ASSEMBLY THEREOF

BACKGROUND OF THE INVENTION

1. Field of The Invention

The present invention relates to a memory card, a card connector and an assembly of the card and connector, and particularly to a memory card adapted to be received in a card connector with correct orientation and the card connector has an ejector mechanism for ejecting the memory card therefrom.

2. The Prior Art

Memory cards have become popular due to the trend of compact size, modularization, and object oriented requirements of modern computers, therefore some appliances such as cellular phones and digital cameras commonly use memory cards for data storage. The PCMCIA standard is used as a guideline for some large-sized memory cards and the related card connectors. Thus, there are existing card connectors having sophisticated ejection mechanisms for ejecting the memory card therefrom. However, for small-sized memory cards and the related card connectors, the ejection mechanism is absent therefore a user can only manually withdraw the memory card whereby the memory card may become damaged. Another problem arising from small memory cards and connectors is noise interference due to insufficient shielding. A further problem is that conventional memory cards are not provided with anti-disorientation means, therefore incorrect directional insertion will cause problems. For example, damage to the memory card or even the card connector may result. Moreover, conventional memory cards do not provide a read/write locking means whereby the memory card can not be protected from unauthorized reading/writing of the memory card. Thus, it is requisite to provide an improved memory card, card connector and assembly thereof to overcome the above problems.

SUMMARY OF THE INVENTION

The primary purpose of the present invention is to provide a memory card connector which ensures correct orientation when inserting an external memory card into the card connector.

A second purpose of the present invention is to provide a memory card connector which has an auxiliary ejector mechanism for facilitating ejection of a memory card from the card connector without damaging the memory card.

A third purpose of the present invention is to provide a memory card which has a read/write lock for preventing unauthorized reading/writing.

A fourth purpose of the present invention is to provide a memory card/card connector assembly having a satisfactory shielding effect for suppressing noise.

In accordance with one aspect of the present invention, a card connector comprises housing/guiding means which includes a contact reception housing defining a plurality of passageways for receiving contacts therein and two guiding arms extending from distal ends of the housing each defining an inner channel confronting each other for guiding an external memory card toward the housing, and an identification protrusion projecting from one of the inner channels thereby forming an asymmetric structure between the inner channels for ensuring correct orientation of the external memory card.

In accordance with a second aspect of the present invention, a card connector comprises housing/guiding means which includes a contact reception housing defining a plurality of passageways for receiving contacts therein and two guiding arms extending from distal ends of the housing each defining an inner channel confronting each other for guiding an external memory card toward the housing, and an identification protrusion projecting from one of the inner channels thereby forming an asymmetric structure between the inner channels for ensuring correct orientation of the external memory card. A metal frame includes a base and two upright walls extending upward from two sides of the base for receiving the housing/guiding means therein for shielding the contacts. The card connector further comprises a lever plate having a base movably positioned between the housing and the base of the metal frame and defining a pivot hole pivotably engaged with the positioning protrusion and having an engaging end extending through a slot of one of the upright walls of the metal frame for engaging with a push bar which is slidably retained in a guiding channel defined in an outer surface of the upright wall of the metal frame which defines the slot so that the lever plate can pivot about the positioning protrusion when driven by the push bar.

In accordance with a third aspect of the present invention, a memory card comprises an insulative housing having a top wall, a bottom wall, and two side walls connected therebetween, thereby defining a reception space between the walls. A printed circuit board is received in the reception space of the insulative housing. A contact reception housing is positioned in the reception space of the insulative housing and defines a plurality of passageways for receiving a corresponding number of contacts therein. An identification member extends from at least one of the side walls and has an asymmetric cross-section for ensuring correct orientation of the memory card during insertion into an external card connector.

These and additional objects, features and advantages of the present invention will become apparent after reading the following detailed description of the preferred embodiments of the invention taken in conjunction with the appended drawing figures.

DETAILED DESCRIPTION OF THE PREFERRED EMBODIMENTS

Figure 1:
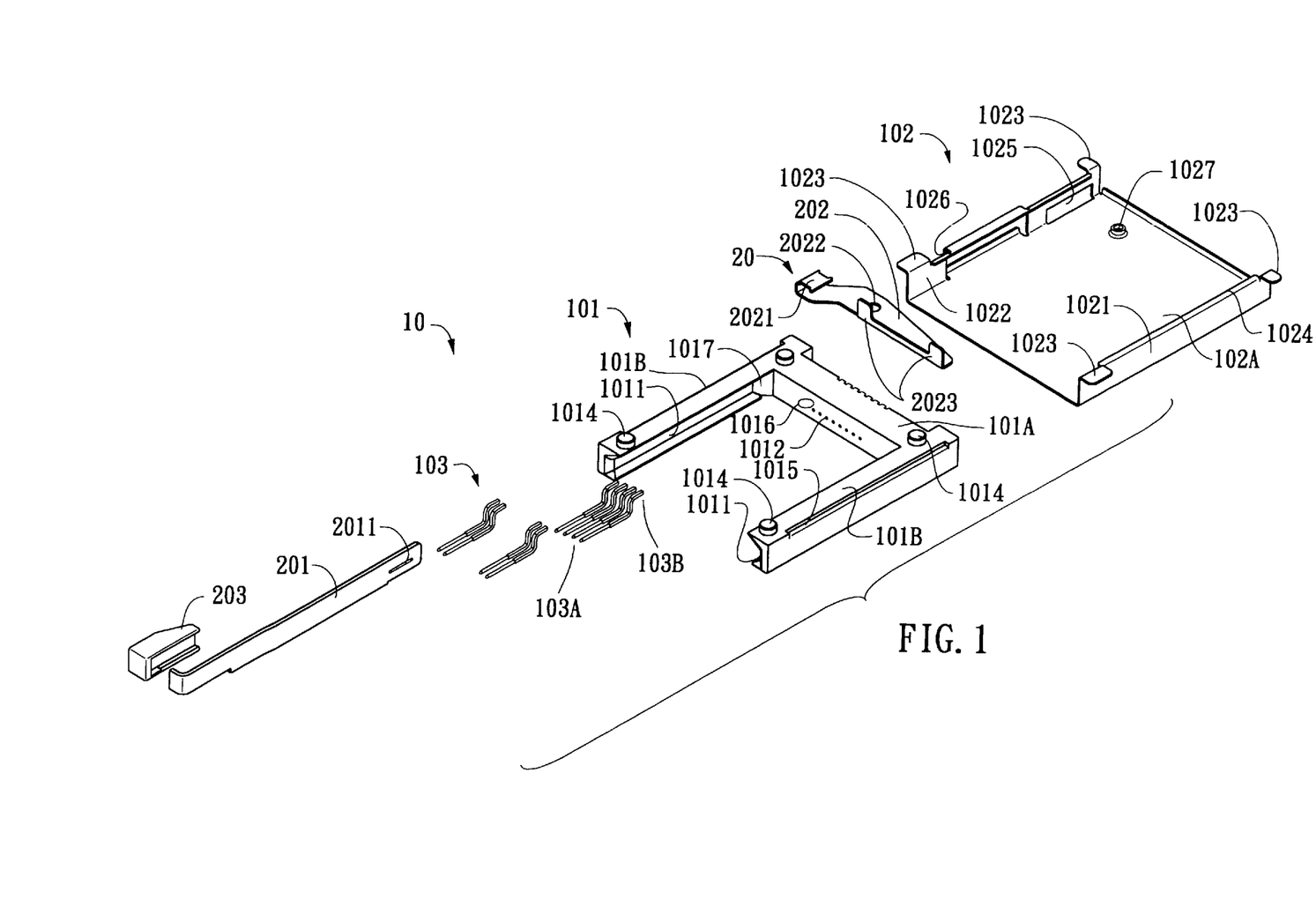
FIG. 1 is an exploded view of a memory card connector in accordance with the present invention.
Figure 2A:
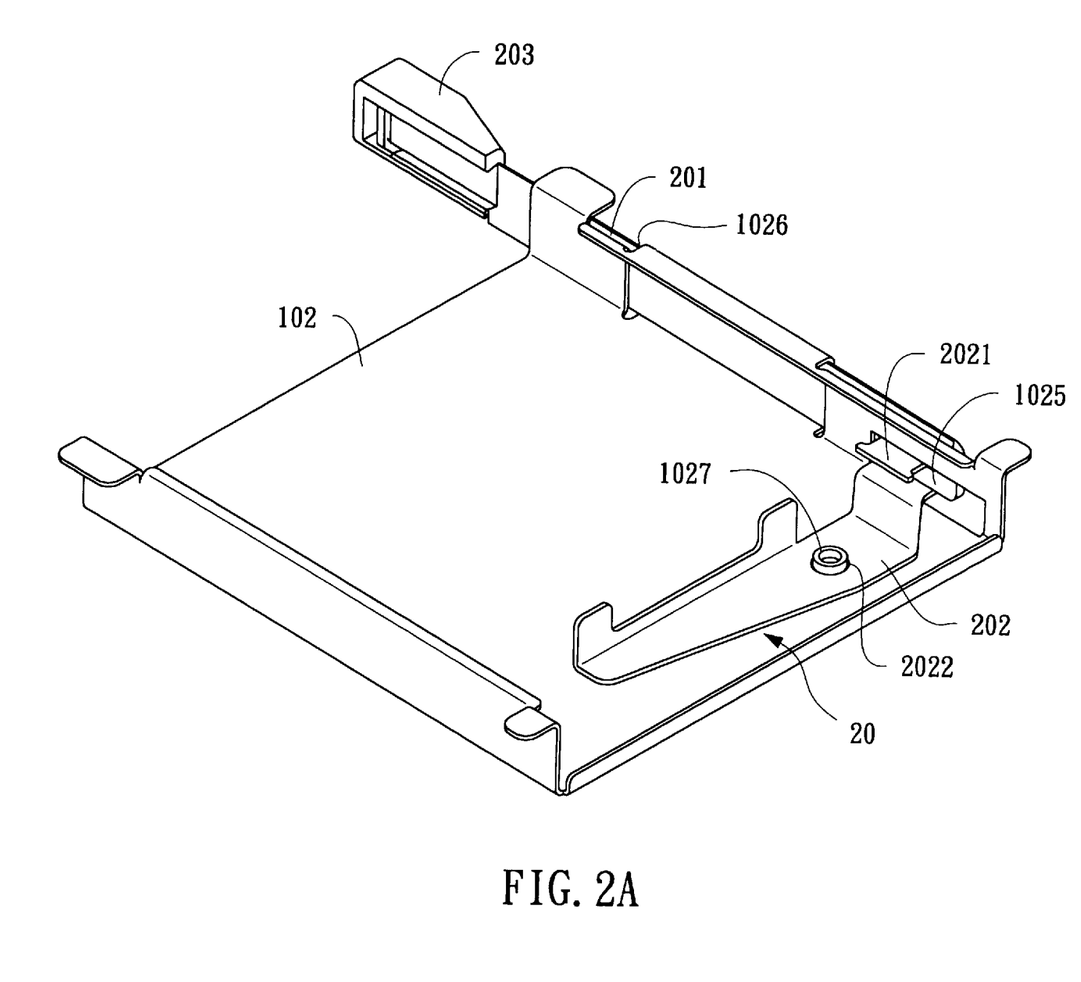
FIG. 2A is an assembled view of an ejector mechanism of the memory card connector of FIG. 1.
Figure 2B:
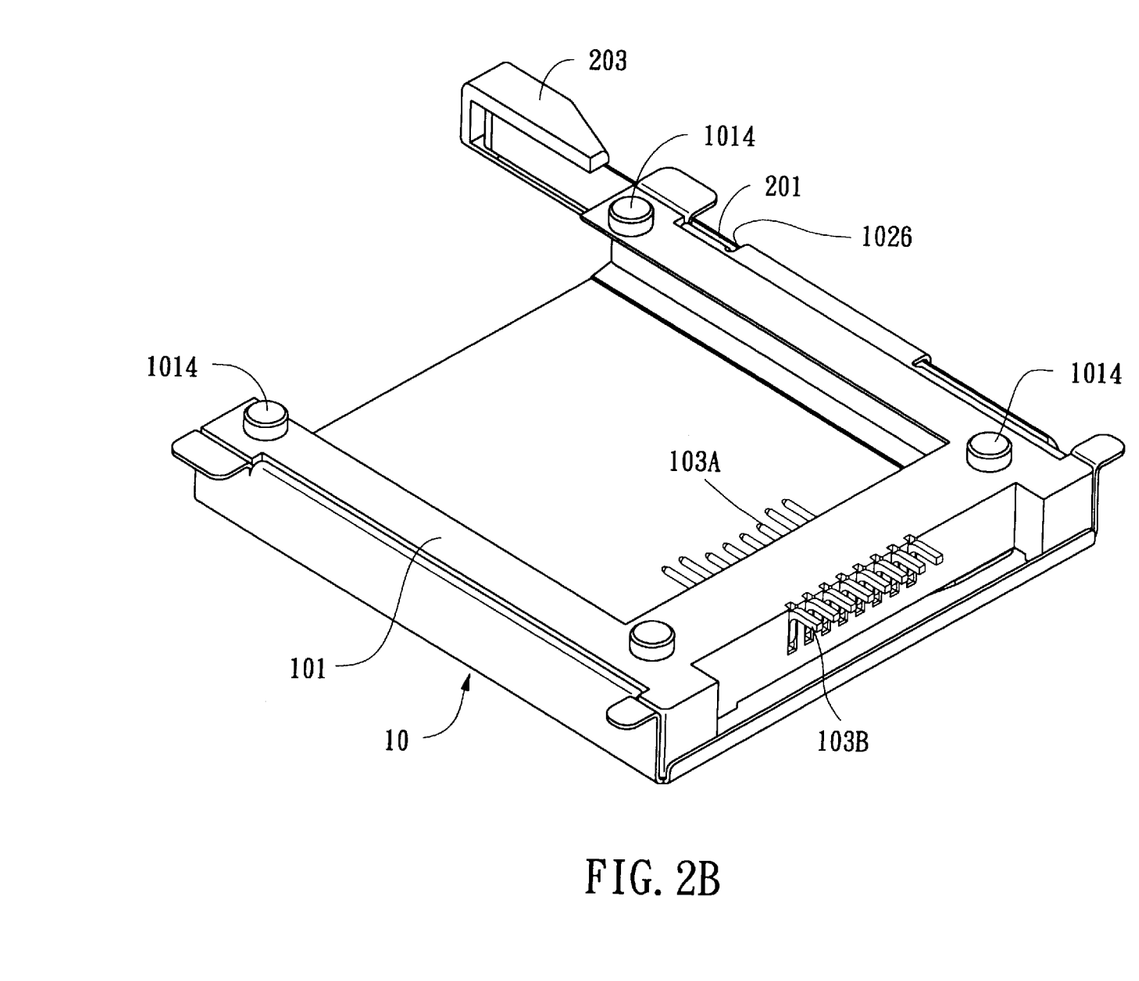
FIG. 2B is a fully assembled view of FIG. 1.

Referring to FIGS. 1, 2A and 2B, a card connector 10 in accordance with the present invention comprises housing/guiding means 101 having a contact reception housing 101A, and two guiding arms 101B extending from distal ends of the housing 101A and retained in a metal frame 102 having a base 102A and first and second upright walls 1021, 1022 extending upward from two sides of the base 102A. A lever plate 20 is pivotably positioned between the housing 101A and the metal frame 102, and movably driven by a push bar 201 which is slidably retained in a guiding channel 1026 defined in an outer surface of the upright wall 1022 of the metal frame 102.

Specifically, the housing 101A defines a positioning hole 1016 for engaging with a positioning protrusion 1027 extending from the base 102A of the metal frame 102. Positioning protrusions 1014 extend from upper surfaces of the housing 101A and the guiding arms 101B for engaging with corresponding holes defined in an external printed circuit board (not shown). The housing 101A defines a plurality of passageways 1012 for receiving corresponding number of contacts 103 therein. Each contact 103 comprises a mating portion 103A and a soldering portion 103B extending from opposite faces of the housing 101A. The metal frame 102 not only receives and retains the housing/guiding means 101 but also shields the contacts 103.

Each guiding arm 101B defines an inner channel 1011 confronting each other for guiding a memory card 11 (FIG. 6) toward the housing 101A. An identification protrusion 1017 projects from one end of the inner channel 1011 of one of the guiding arms 101B thereby forming an asymmetric structure between the inner channels 1011 for ensuring correct orientation of the memory card 11 during insertion into the card connector 10.

Each guiding arm 101B defines a groove 1015 along an upper outer edge thereof and each upright wall 1021, 1022 of the metal frame 101 has a flange 1024 extending inwardly for engaging with the groove 1015 of the corresponding guiding arm 101B. Each upright wall 1021, 1022 has at least one outwardly extending soldering pad 1023 for soldering onto the external printed circuit board.

The metal frame 102 defines a slot 1025 in the upright wall 1022 allowing a portion of the lever plate 20 to extend therethrough and reciprocally move therein by a driving force from the push bar 201.

Figure 6:
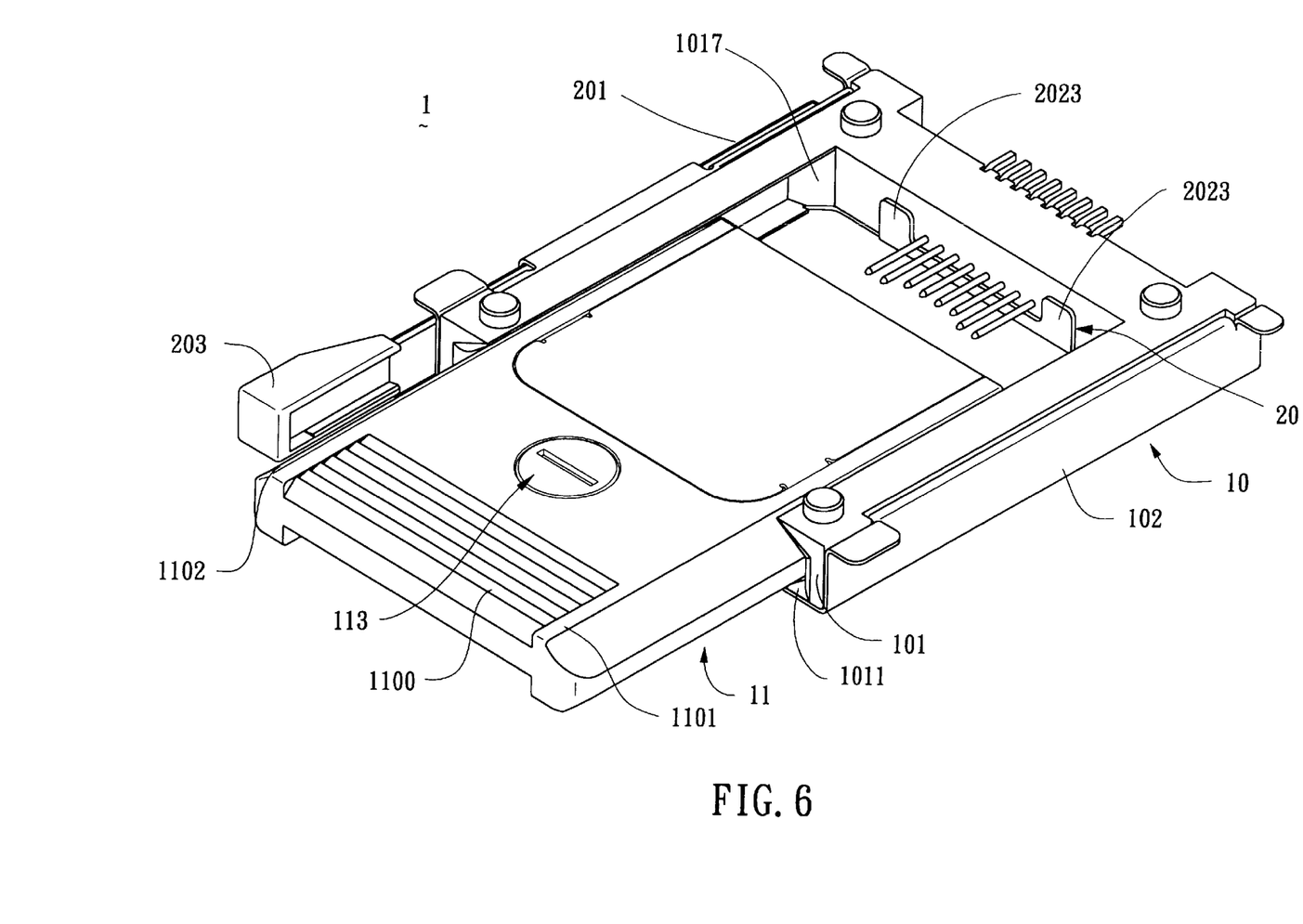
FIG. 6 illustrates the insertion of the memory card into the card connector.

The lever plate 20 includes a base 202 movably positioned between the housing 101A and the base 102A of the metal frame 102. A pivot hole 2022 is defined in the base 202 for pivotably engaging with the positioning protrusion 1027 of the metal frame 102 so that when the push bar 201 is manually driven along an elongate direction of the upright wall 1022, the lever plate 20 pivots about the positioning protrusion 1027. Specifically, a slit 2011 defined in the push bar 201 firmly engages with a U-shaped engaging end formed by the lever plate 20. Two ejection tabs 2023 extend perpendicularly from the base 202 of the lever plate 20 for ejecting an inserted memory card 11 (FIG. 6). A push button 203 is fixed to a free end of the push bar 201 allowing a user to move the push bar 201 along a lengthwise direction of the upright wall 1022 of the metal frame 102.

Figure 3:
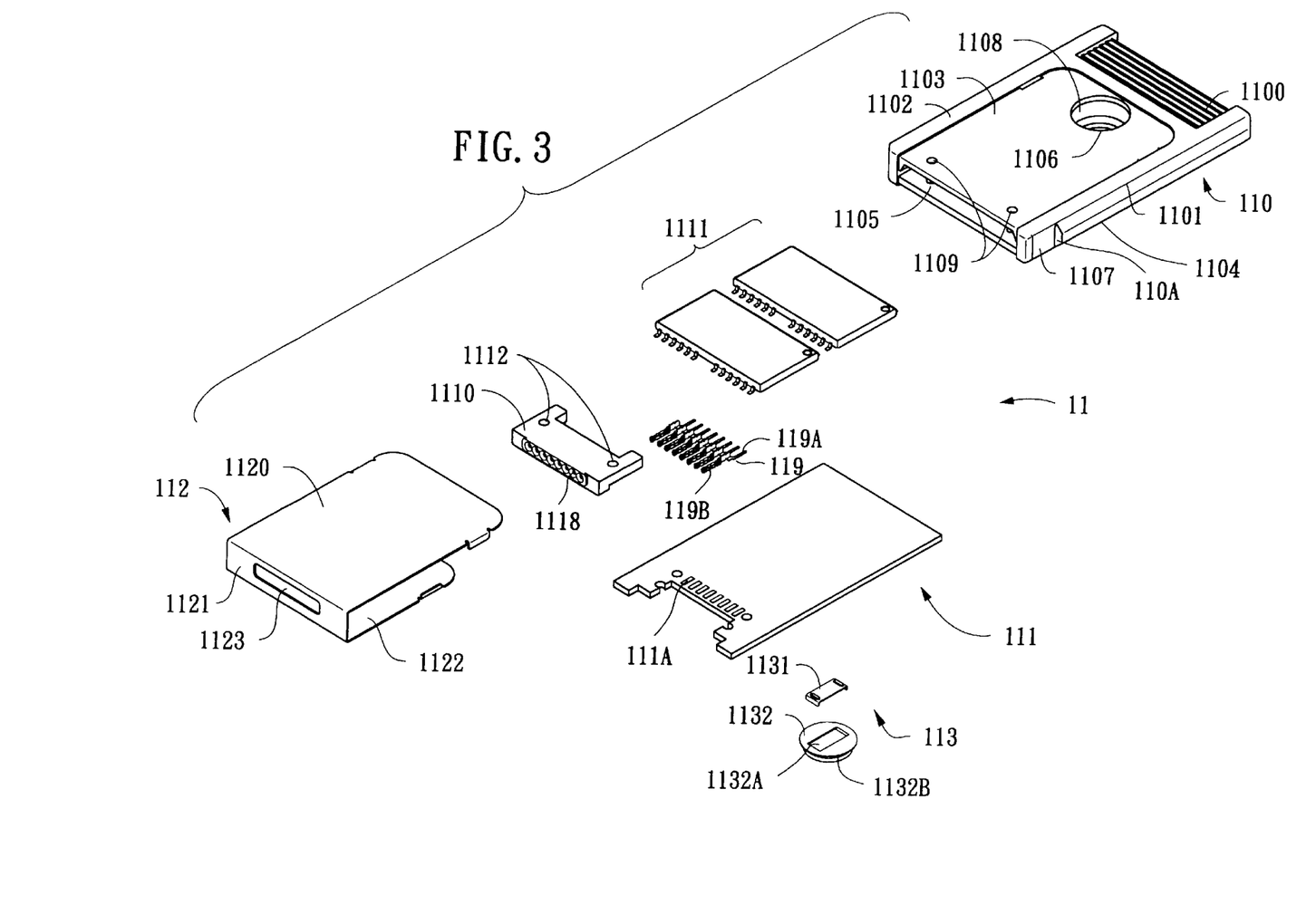
FIG. 3 is an exploded view of a memory card in accordance with the present invention.

Referring to FIG. 3, the memory card 11 comprises an insulative housing 110 having a top wall 1103, a bottom wall 1104, and two side walls 1101, 1102 connected therebetween, thereby defining a reception space 1105 between the walls 1101, 1102, 1103, 1104.

Figure 4A:
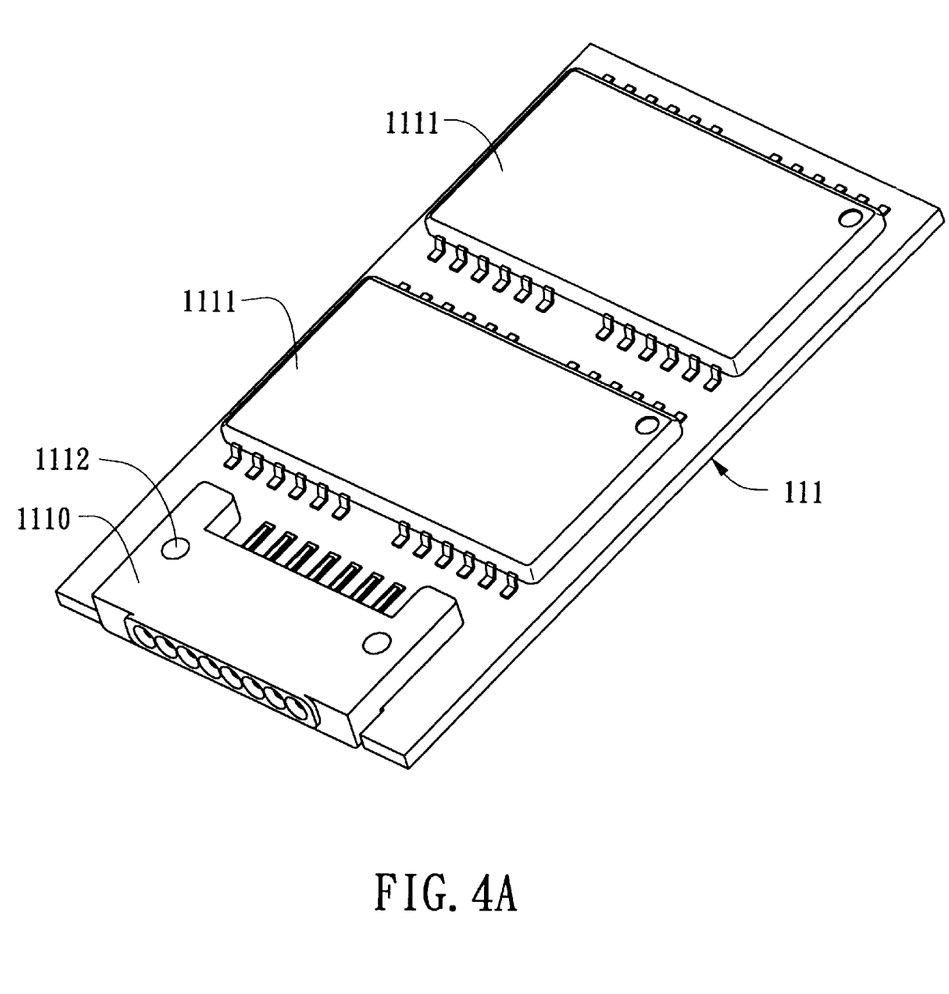
FIG. 4A is a partially assembled view of FIG. 3 showing a configuration of a housing means and a printed circuit board.
Figure 4B:
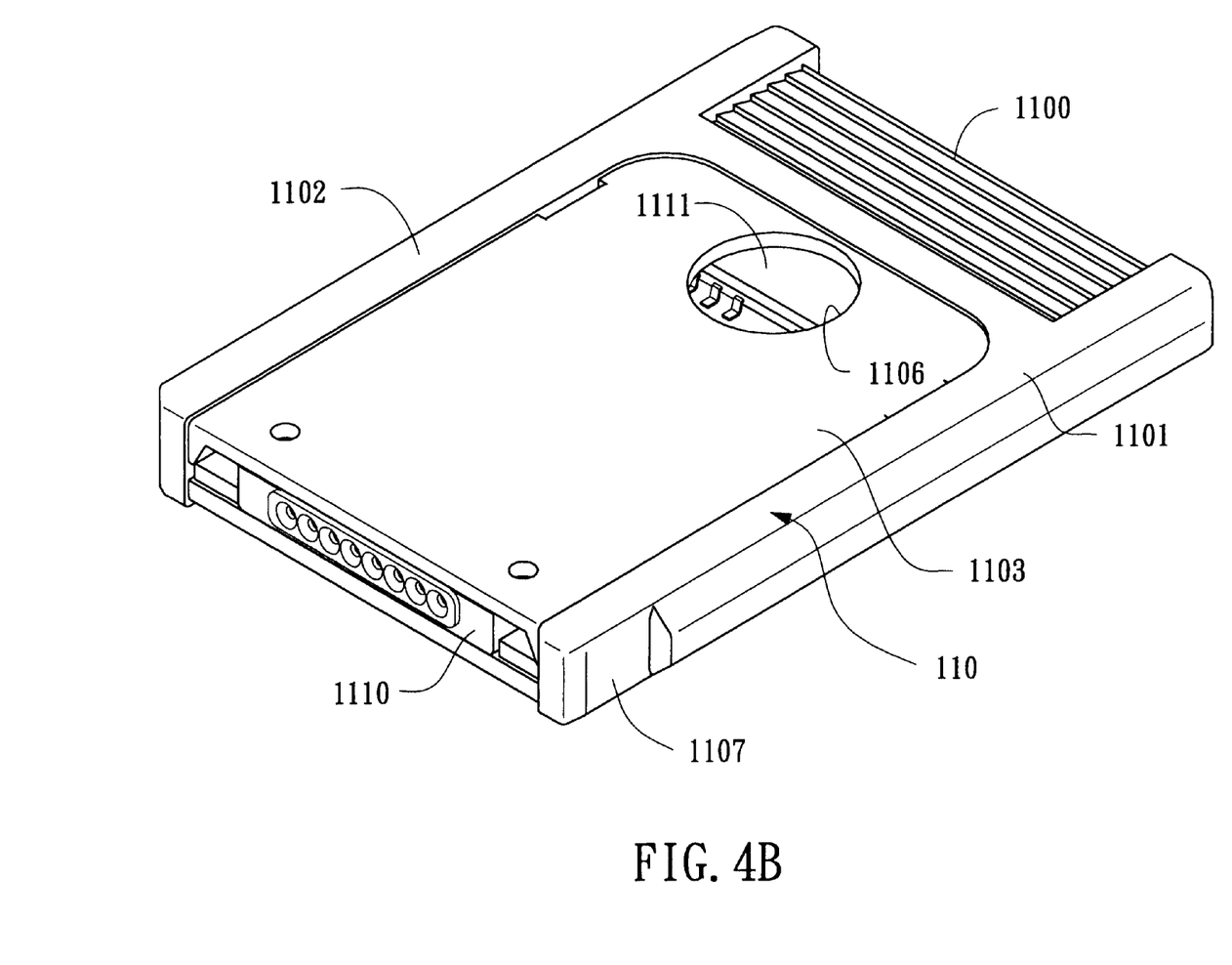
FIG. 4B is a partially assembled view of FIG. 3 wherein a metal shielding is not configured to the assembly.

Also referring to FIGS. 4A and 4B, a printed circuit board 111 having electrical components 1111 soldered thereon is received in the reception space 1105 of the insulative housing 110. A contact reception housing 1110 is positioned in the reception space 1105 of the insulative housing 110 and defines a plurality of passageways 1118 for receiving a corresponding number of contacts 119 therein. An identification member 110A extends from at least one of the side walls 1101, 1102 and has an asymmetric cross-section for ensuring correct orientation of the memory card 11 during insertion into the card connector 10. The identification member 110A defines a step cutout 1107 at one end thereof for confronting the corresponding positioning protrusion 1017 formed in the card connector 10 when the memory card 11 is inserted therein. A read/write locking device 113 is retained in a reception hole 1106 defined in the top wall 1103 of the insulative housing 110. Specifically, the reception hole 1106 is bound by an inner periphery extending downward from the top wall 1103 and a circular protrusion 1108 extends from the inner periphery. The read/write locking device 113 includes a knob 1132 defining a reception slot 1132A in a center thereof and a circular recess 1132B substantially at an intermediate portion between upper and lower portions thereof for rotatably engaging with the circular protrusion 1108 of the reception hole 1106. A spring switch 1131 is retained in the reception slot 1132A and electrically connected to the printed circuit board 111. The knob 1132 may be rotated to activate/deactivate the memory card 11 by the spring switch 1131.

The top and bottom walls 1103, 1104 each have an interference surface 1100 formed thereon for increasing operative friction during manual operation of the memory card 11.

The contact reception housing 1110 defines two first holes 1112 therein and the top wall 1103 of the insulative housing 110 defines corresponding second holes 1109 aligning with first holes 1112 for receiving allowing bolts (not shown) therein thus fixing the contact reception housing 1110 to an underside of the top wall 1103 of the insulative housing 110.

Figure 4C:
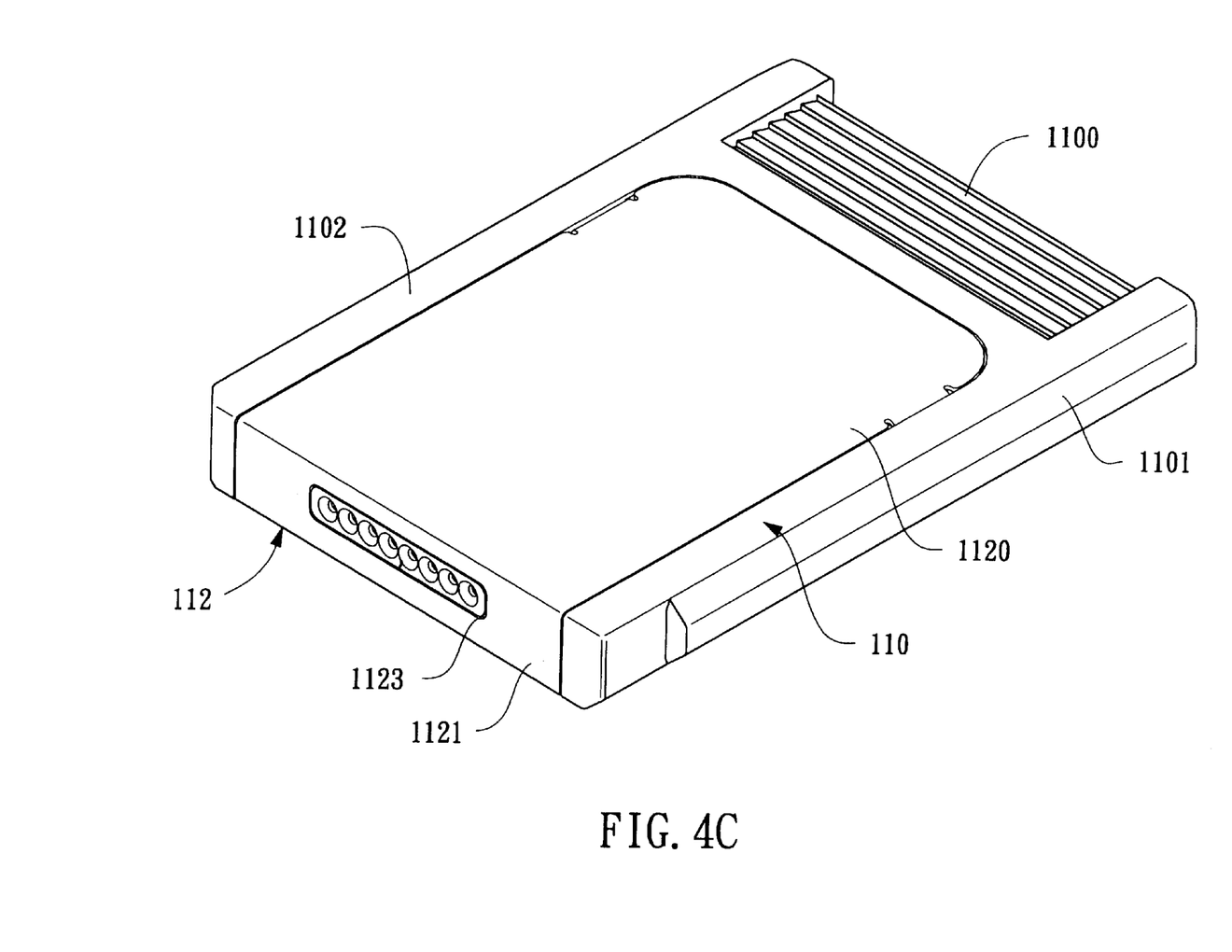
FIG. 4C is a fully assembled view of FIG. 3.

Also referring to FIG. 4C, a metal shielding 112 having a top face 1120 connected to a front face 1121 connected to a bottom face 1122 is fixed around the insulative housing 110, wherein the front face 1121 defines a slot 1123 in communication with the passageways 1118 of the contact reception housing 1110. Therefore the contacts 119 received in the passageways 1118 are accessible via the slot 1123 of the metal shielding 112. Each contact 119 has a mating portion 119B and a soldering portion 119A which is soldered to a corresponding soldering pad 111A of the printed circuit board 111.

Figure 5:
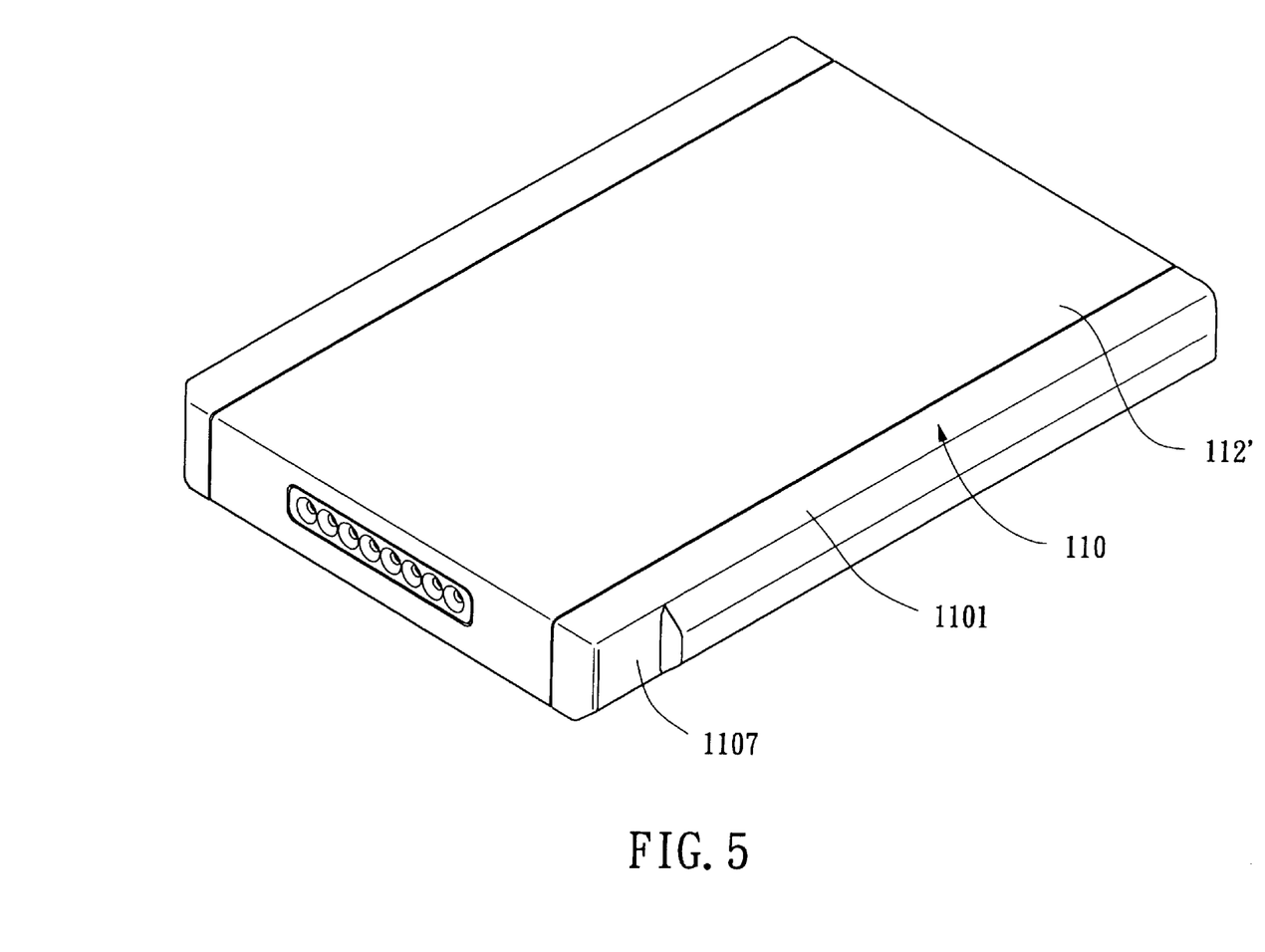
FIG. 5 is a second embodiment of the memory card.

Referring to FIG. 5, the metal shielding 112 of FIG. 4C may be replaced with a different metal shielding 112' which almost fully encloses the insulative housing 110 for reinforcing the shielding effect of the memory card 11.

FIG. 6 illustrates that the memory card 11 can be inserted into the card connector 10 provided that the side walls 1101, 1102 mate with the inner channels 1011 of the guiding arms 101B of the card connector 10 when the memory card 11 is inserted having the correct orientation. After insertion, the memory card 11 may be ejected from the card connector 10 by operating the push button 203 which in turn drives the push bar 201 and the lever plate 20 thus forcing the ejection tabs 2023 to eject the memory card 11.

While the present invention has been described with reference to specific embodiments, the description is illustrative of the invention and is not to be construed as limiting the invention.

Therefore, various modifications to the present invention can be made to the preferred embodiments by those skilled in the art without departing from the true spirit and scope of the invention as defined by the appended claims.

What is claimed is:

1. A card connector comprising housing/guiding means which includes a contact reception housing defining a plurality of passageways for receiving contacts therein and two guiding arms extending from distal ends of the housing each defining an inner channel confronting each other for guiding an external memory card toward the housing, an identification protrusion projecting from one of the inner channels thereby forming an asymmetric structure between the inner channels for ensuring correct orientation of the external memory card during insertion.

2. The card connector as claimed in claim 1 further comprising a metal frame having a base and two upright walls extending upward from two sides of the base for receiving the housing/guiding means therein for shielding the contacts.

3. The card connector as claimed in claim 2, wherein the housing defines a positioning hole and the metal frame has a positioning protrusion adapted to be engaged with the positioning hole of the housing.

4. The card connector as claimed in claim 3, wherein each guiding arm defines a groove along an upper outer edge thereof and each upright wall of the metal frame has a flange extending inwardly for engaging with the groove of the corresponding guiding arm.

5. The card connector as claimed in claim 4, wherein each upright wall has at least one outwardly extending soldering pad for soldering onto an external printed circuit board.

6. The card connector as claimed in claim 3 further comprising a lever plate having a base movably positioned between the housing and the base of the metal frame and defining a pivot hole pivotably engaged with the positioning protrusion of the metal frame and having an engaging end extending through a slot defined in one of the upright walls of the metal frame for engaging with a push bar which is slidably retained in a guiding channel defined in an outer surface of the upright wall of the metal frame which defines the slot so that the lever plate pivots about the positioning protrusion when driven by the push bar.

7. The card connector as claimed in claim 6, wherein the push bar defines an engaging slit at one end thereof for engaging with the engaging end of the lever plate.

8. The card connector as claimed in claim 7, wherein at least one ejection tab extends perpendicularly from the base for ejecting an inserted memory card.

9. A memory card comprising:
an insulative housing having a top wall, a bottom wall, and two side walls connected therebetween, thereby defining a reception space between the walls;
a printed circuit board received in the reception space of the insulative housing;
a contact reception housing positioned in the reception space of the insulative housing and defining a plurality of passageways for receiving corresponding number of contacts therein; and
an identification member extending from at least one of the side walls and having an asymmetric cross-section for ensuring correct orientation of the memory card during insertion into an external card connector.

10. The memory card as claimed in claim 9, wherein the identification member defines a step cutout at one end thereof for confronting a corresponding protrusion formed in the external card connector.

11. The memory card as claimed in claim 9, wherein the insulative housing has a read/write locking device installed therein, the read/write locking device including a knob operative to activate/deactivate the memory card.

12. The memory card as claimed in claim 11, wherein the read/write locking device has a spring switch retained in the knob which is rotatably retained in the insulative housing.

13. The memory card as claimed in claim 12, wherein the top wall of the insulative housing defines a reception hole bound by a downward periphery which has a circular protrusion extending therefrom for engaging with a circular recess defined in an intermediate portion of the knob of the read/write locking device.

14. The memory card as claimed in claim 9, wherein the contact reception housing defines a plurality of first holes therein and the top wall of the insulative housing defines corresponding second holes aligning with the first holes for receiving bolts therein thus fixing the contact reception housing to an underside of the top wall of the insulative housing.

15. The memory card as claimed in claim 14 further comprising a metal shielding for suppressing noise, the metal shielding having a top face connected to a front face connected to a bottom face, wherein the front face defines a slot in communication with the passageways of the contact reception housing.

16. The card connector as claimed in claim 11, wherein the knob of the read/write locking device defines a reception slot for retaining the spring switch therein.

17. A memory card/card connector assembly comprising:
a memory card comprising an insulative housing having a top wall, a bottom wall, and two side walls connected therebetween, thereby defining a reception space between the walls, a printed circuit board received in the reception space of the insulative housing, a contact reception housing positioned in the reception space of the insulative housing and defining a plurality of passageways for receiving a corresponding number of first contacts therein, and an identification member extending from at least one of the side walls and having an asymmetric cross-section; and
a card connector comprising housing/guiding means which includes a contact reception housing defining a plurality of passageways for receiving a corresponding number of second contacts therein and two guiding arms extending from distal ends of the housing each defining an inner channel confronting each other for guiding the memory card toward the housing;
whereby the identification member of the memory card only fits into the inner channels of the card connector with a predetermined orientation thereby ensuring correct orientation of the memory card during insertion into the card connector.

18. The memory card/card connector assembly as claimed in claim 17, wherein an identification protrusion projects from one of the inner channels of the card connector and the identification member of the memory card defines a step cutout at one end thereof for confronting the protrusion of the card connector.

19. A card connector comprising housing/guiding means which includes a contact reception housing defining a plurality of passageways for receiving contacts therein and two guiding arms extending from distal ends of the housing each defining an inner channel confronting each other for guiding an external memory card toward the housing, a metal frame attached to the housing, a lever plate having a base movably positioned between the housing and the metal frame, at least one ejection tab extending perpendicularly from the base of the lever plate for ejecting an inserted memory card, and said lever plate being pivotable about a protrusion of the frame by which the housing and the frame is aligned and oriented.

* * * * *